US008590919B2

(12) United States Patent
Yi

(10) Patent No.: US 8,590,919 B2
(45) Date of Patent: Nov. 26, 2013

(54) STROLLER FRAME FOR FOLDABLE STROLLER

(75) Inventor: Ze-Hua Yi, Central (HK)

(73) Assignee: Wonderland Nurserygoods Company Limited, Central (HK)

( * ) Notice: Subject to any disclaimer, the term of this patent is extended or adjusted under 35 U.S.C. 154(b) by 310 days.

(21) Appl. No.: 12/969,570

(22) Filed: Dec. 15, 2010

(65) Prior Publication Data

US 2012/0104729 A1 May 3, 2012

(30) Foreign Application Priority Data

Nov. 1, 2010 (CN) .......................... 2010 1 0546579

(51) Int. Cl.
*B62B 1/00* (2006.01)

(52) U.S. Cl.
USPC .......................................................... 280/642

(58) Field of Classification Search
USPC ......... 280/33.993, 47.38, 639, 642, 643–644, 280/647–650, 658
See application file for complete search history.

(56) References Cited

U.S. PATENT DOCUMENTS 8,128,119 B2 * 3/2012 Saville et al. ................. 280/648
2007/0096434 A1 * 5/2007 Haeggberg .................... 280/642
2009/0033066 A1 2/2009 Saville

* cited by examiner

*Primary Examiner* — John Walters
*Assistant Examiner* — James Triggs
(74) *Attorney, Agent, or Firm* — Winston Hsu; Scott Margo

(57) ABSTRACT

A stroller frame is disclosed and includes a front-leg support member, a rear-leg support member, an upper support member, and a connection device which connects the front-leg support member, the rear-leg support member, and the upper support member respectively, such that the rear-leg support member and the upper support member can rotate relative to a first rotation axis and the front-leg support member and the rear-leg support member can rotate relative to a second rotation axis. Thereby, the invention uses just the integrated connection device to fold the three support members smoothly, which solves the problem that a foldable stroller in the prior art usually realizes the folding by a pivot device which rotates two of support members thereof so as to drive the other support members but is accompanied by the difficulty in reducing the length of the folded stroller.

8 Claims, 15 Drawing Sheets

3 56 58 36 36 46 A 382 386 382 524 386 38 384 388 40 50 384 50 48 48 388 32 40 32 34 34 42 34 52 522 44 522 42 54

STROLLER FRAME FOR FOLDABLE STROLLER

BACKGROUND OF THE INVENTION

1. Field of the Invention

The invention relates to a stroller frame for a foldable stroller, and especially relates to a stroller frame having a connection device capable of simultaneously folding three support members connected thereto.

2. Description of the Prior Art

There are strollers designed to be foldable for satisfying the request of small folded volume and easy carry. The way thereto utilizes pivot devices to make the frame of the stroller foldable for reducing the volume thereof.

Please refer to FIG. 1, which illustrates a side view of a stroller 1 in the prior art. The stroller 1 utilizes a plurality of pivotally-connected parts to form a frame including a front-leg support member 12, a rear-leg support member 14, an upper support member 16, a seat support member 18, and a pivot device 20. On the whole, the length formed by the upper support member 16 and the front-leg support member 12 is the longest, so the pivot device 20 is disposed at the place where the upper support member 16 and the front-leg support member 12 are connected so as to reduce the height of the folded stroller 1. In the embodiment, the pivot device 20 is disposed at a position such that the lengths of the upper support member 16 and the front-leg support member 12 are substantially equal. It is added that the lengths herein are defined by referring to rotation axes of pivotal connections.

Please refer to FIG. 2, which illustrates a side view of the stroller 1 in FIG. 1 after being folded. The upper support member 16 and the front-leg support member 12 can rotate to each other by use of the pivot device 20, and the rear-leg support member 14 and the seat support member 18 follow to rotate to be folded. Obviously, the length of the folded stroller 1 is still longer than that of the front-leg support member 12 or the upper support member 16, even than that of the rear-leg support member 14. In fact, in the embodiment, the height of the folded stroller 1 depends on the sum of the length of the rear-leg support member 14 un-connected to the pivot device 20 and the length from the pivotal connection between the rear-leg support member 14 and the upper support member 16 to the pivot device 20.

Therefore, the length of a folded stroller does not depend just on the longest length formed by adjacent support members thereof; however, most of the pivot devices of the present strollers can fold only two support members simultaneously. In the above embodiment, even though the pivot device 20 is moved to another disposition position, the length of the folded stroller 1 is still longer than that of any of the support members.

SUMMARY OF THE INVENTION

An objective of the invention is to provide a stroller frame for a foldable stroller. The stroller frame has a connection device capable of simultaneously folding three support members connected thereto; thereby, the connection structure of the stroller frame is simplified, and the length of the folded stroller frame can be restrained substantially to the length of one of the support members.

The stroller frame according to the invention includes a front-leg support member, a rear-leg support member, an upper support member, and a connection device. The connection device connects the front-leg support member, the rear-leg support member, and the upper support member respectively, such that the rear-leg support member and the upper support member can rotate relative to a first rotation axis and the front-leg support member and the rear-leg support member can rotate relative to a second rotation axis. Thereby, the stroller frame can fold the three support members smoothly by the integrated connection device.

Compared with the prior art, the invention overcomes the bottleneck that a single pivot device is capable of folding only two support members, and uses the integrated connection device for simultaneously folding the three support members connected thereto, which effects simplification on the connection structure of the stroller frame. Furthermore, the length of the folded stroller frame according to the invention can be restrained to be substantially equal to the length of the longest one of the support members, which solves the problem that the length of a stroller in the prior art is stiller longer than that of any of support members thereof. If the lengths of the three support members connected to the connection device according to the invention are designed on purpose, a stroller having the stroller frame according to the invention can obtain a better reduction of the length of the stroller after being folded relative to the length of the stroller before being folded.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
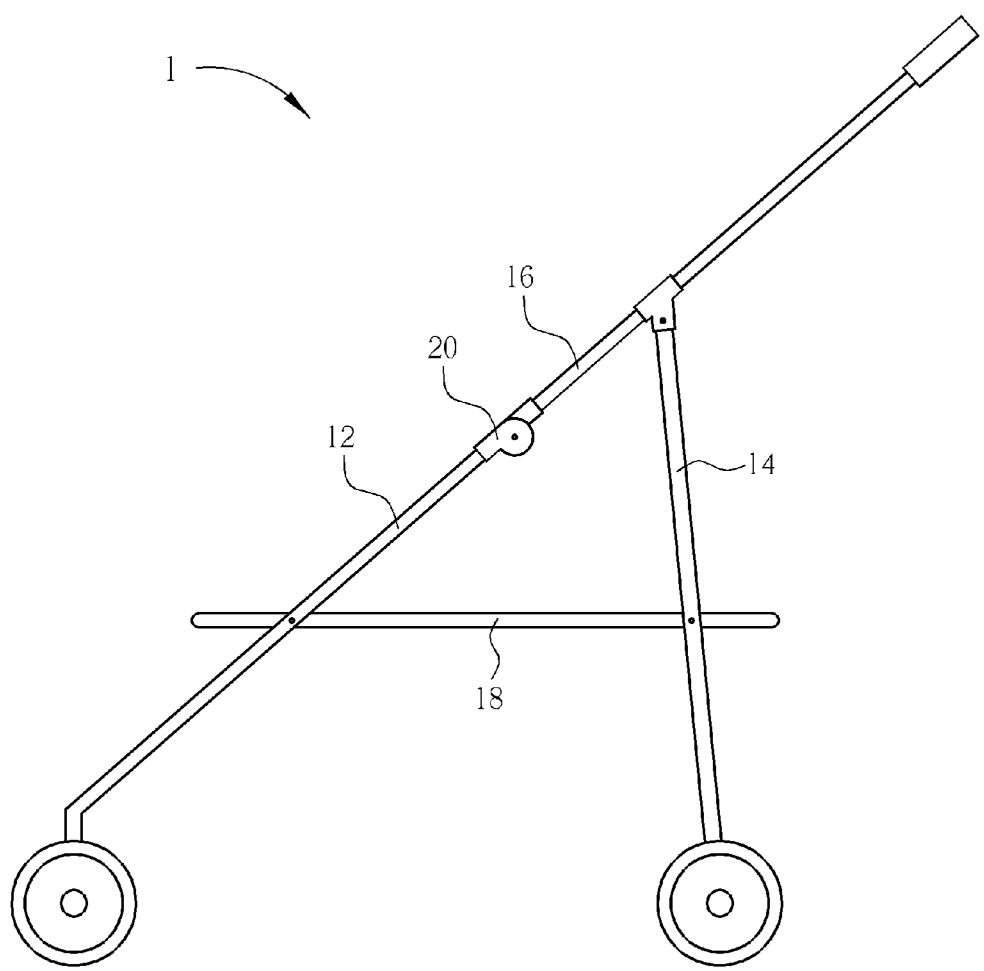
FIG. 1 is a side view of a stroller in the prior art.
Figure 2:
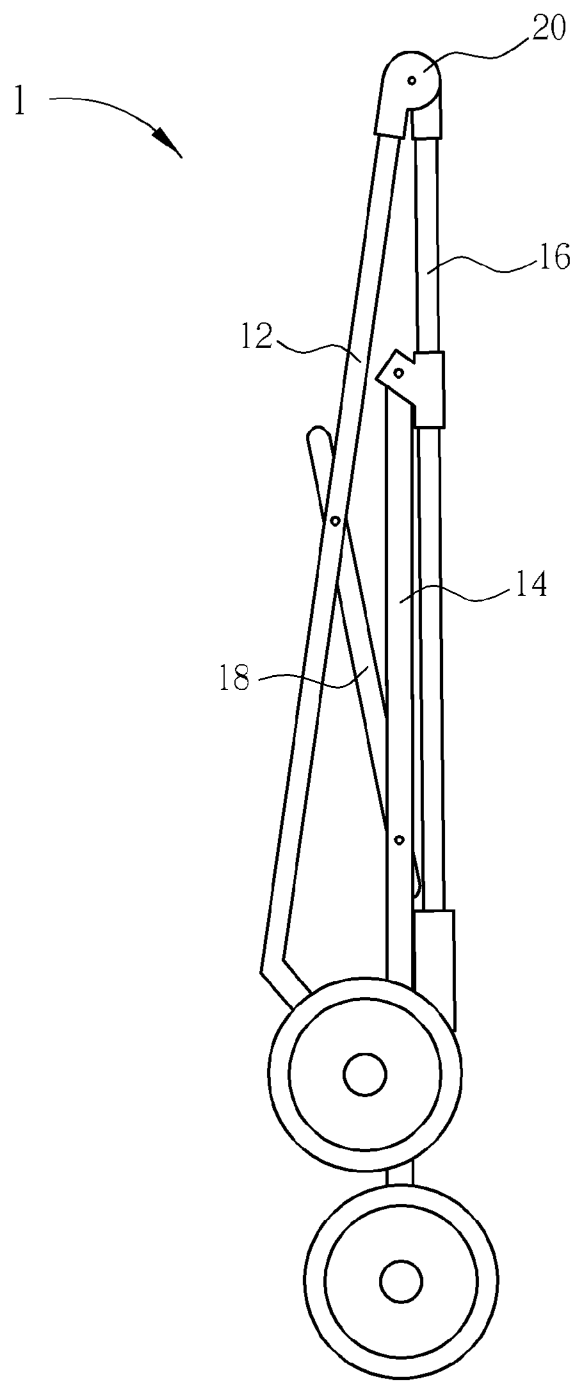
FIG. 2 is a side view of the stroller in FIG. 1 after being folded.
Figure 3:
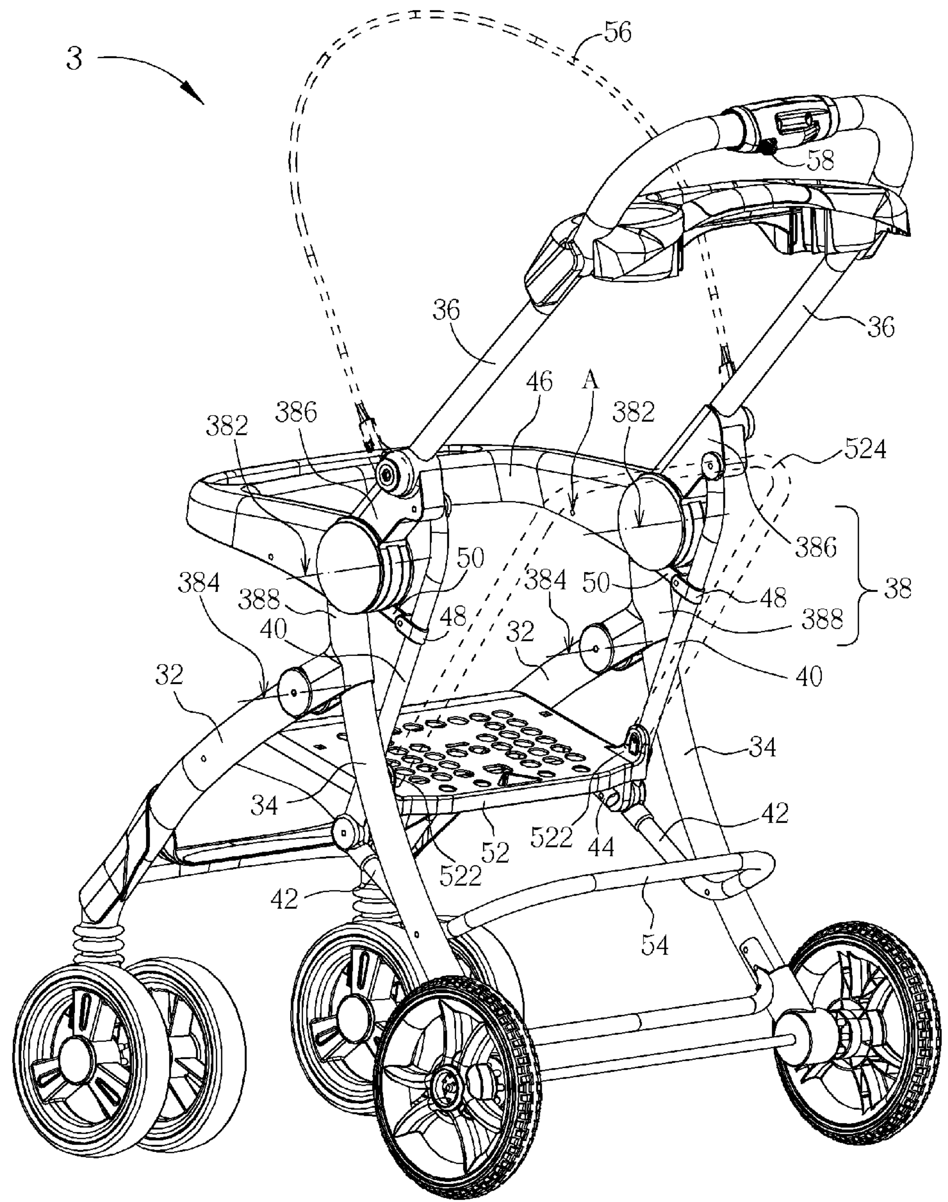
FIG. 3 is an appearance schematic diagram of a foldable stroller of a preferred embodiment according to the invention.
Figure 4:
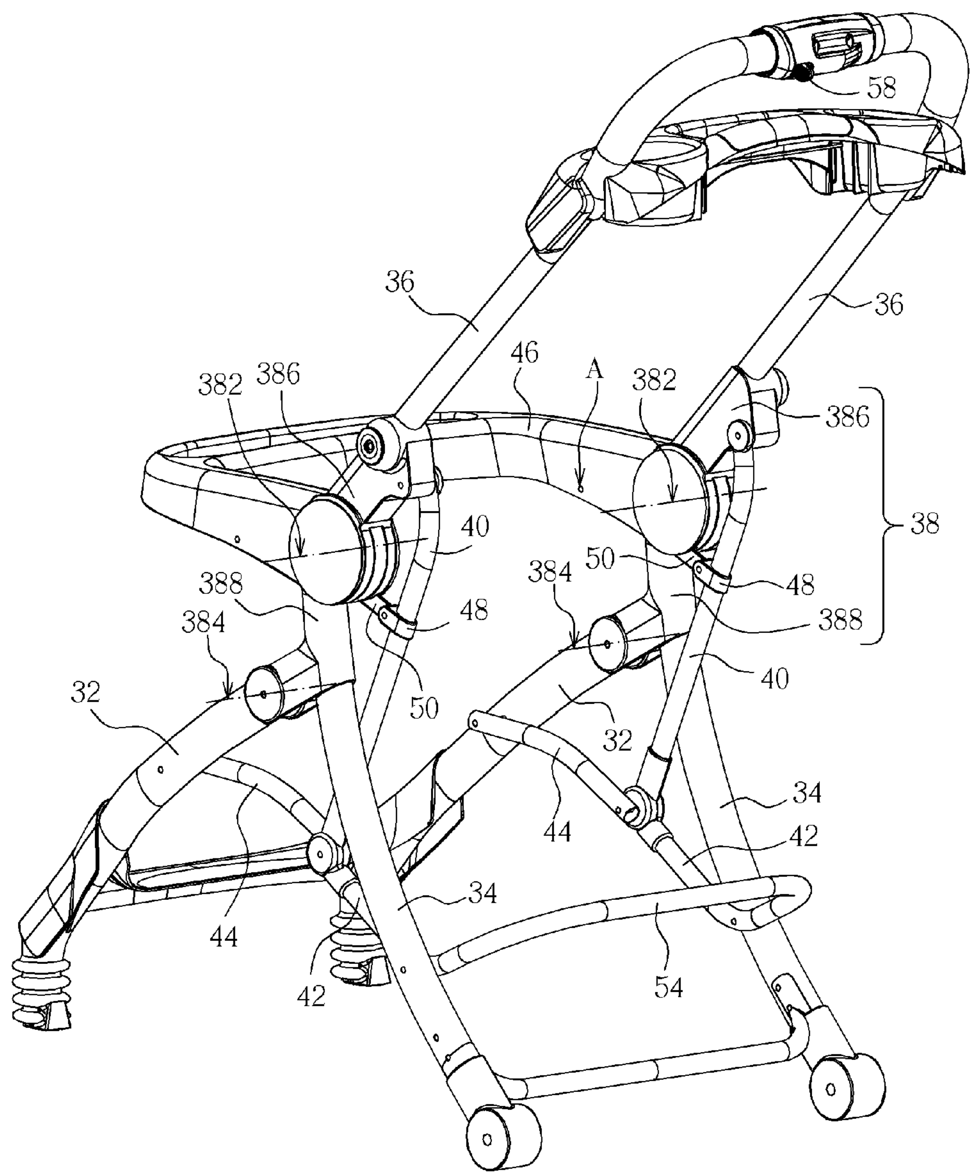
FIG. 4 is a schematic diagram of the main structure of a stroller frame of the foldable stroller in FIG. 3.
Figure 5:
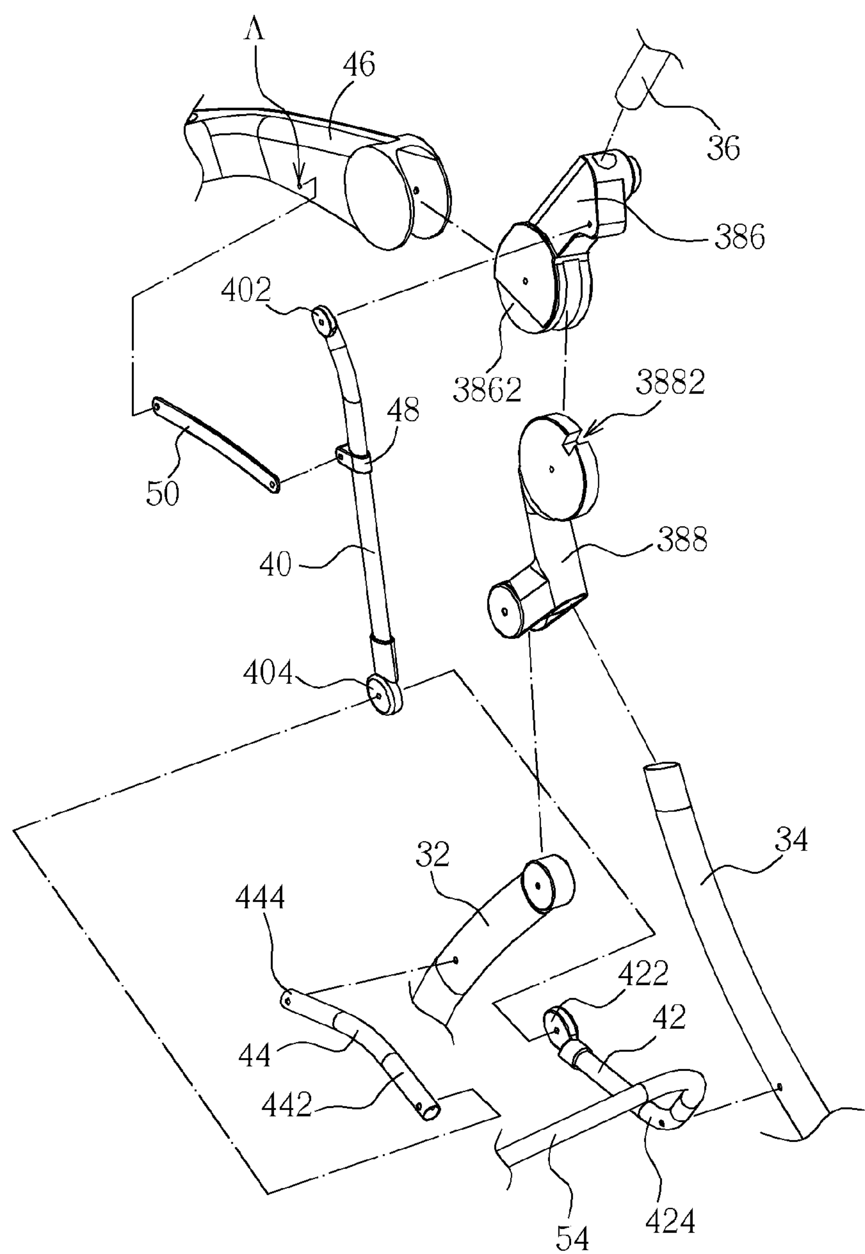
FIG. 5 is a breakdown diagram of part of the stroller frame of the foldable stroller.

Please refer to FIGS. 3 through 5. FIG. 3 is an appearance schematic diagram of a foldable stroller 3 of a preferred embodiment according to the invention. FIG. 4 is a schematic diagram of the main structure of a stroller frame of the foldable stroller 3 in FIG. 3. FIG. 5 is a breakdown diagram of part of the stroller frame of the foldable stroller 3. The stroller frame of the foldable stroller 3 consists mainly of two symmetric side frames, each of which includes a front-leg support member 32, a rear-leg support member 34, an upper support member 36, a connection device 38, and a linkage mechanism. The front-leg support member 32, the rear-leg support member 34, the upper support member 36, and the connection device 38 are able to rotate to each other for folding. The linkage mechanism consists of a plurality of links. The connection device 38 connects the front-leg support member 32, the rear-leg support member 34, and the upper support member 36 respectively, such that the rear-leg support member 34 and the upper support member 36 can rotate relative to a first rotation axis 382 and the front-leg support member 32 and the rear-leg support member 34 can rotate relative to a second rotation axis 384. The linkage mechanism is pivotally connected to the front-leg support member 32, the rear-leg support member 34, and the connection device 38 respectively. Therefore, a user can easily fold the stroller frame through the movement of the linkage mechanism.

Furthermore, in the embodiment, the connection device 38 includes a first pivot part 386 and a second pivot part 388. The first pivot part 386 and the second pivot part 388 are pivotally connected relative to the first rotation axis 382. An end of the upper support member 36 is inserted into a hole of the first pivot part 386 for connecting with the first pivot part 386. In practice, the upper support member 36 can be connected to the first pivot part 386 alternatively by other methods, such as lock engagement, screw lock, adherence, soldering, and so on; however, the invention is not limited to this. Similarly, an end of the rear-leg support member 34 is inserted into a hole of the second pivot part 388 for connecting with the second pivot part 388; with regard to connection methods thereof, the invention is not limited to this either. The second pivot part 388 protrudes out the rear-leg support member 34 to form a pivotal connection portion for pivotally connecting with an end of the front-leg support member 32. Thereby, the front-leg support member 32 can obtain a larger rotation angle without interfering with the rear-leg support member 34.

Furthermore, the linkage mechanism includes a first linking part 40, a second linking part 42, and a third linking part 44. An end portion 402 of the first linking part 40 is pivotally connected to the first pivot part 386. The other end portion 404 of the first linking part 40 is pivotally connected to an end portion 422 of the second linking part 42 and an end portion 442 of the third linking part 44 simultaneously. The other end portion 424 of the second linking part 42 is pivotally connected to the rear-leg support member 34. The other end portion 444 of the third linking part 44 is pivotally connected to the front-leg support member 32. Therefore, when the user presses the upper support member 36 down to rotate toward the rear-leg support member 34, the first pivot part 386 drives the first linking part 40 through the end portion 404 of the first linking part 40 to drive the second linking part 42 and the third linking part 44, so that the front-leg support member 32, the rear-leg support member 34, and the upper support member 36 keep approaching each other till the foldable stroller 3 is completely folded. The successive operation of folding the foldable stroller 3 is described in detail later.

It is added that the upper support member 36 is mounted to the first pivot part 386. Based on principles of the linkage mechanism's movement, the end portion 402 of the first linking part 40 can be pivotally connected to the upper support member 36 alternatively, which is also able to realize the above folding movement. Similarly, based on the principles of the linkage mechanism's movement, the end portion 442 of the third linking part 44 just needs to be pivotally connected to the four-bar linkage mechanism consisting of the first pivot part 386, the first linking part 40, the second linking part 42, and the rear-leg support member 34, so the end portion 442 of the third linking part 44 can be pivotally connected to either the first linking part 40 or the second linking part 42 alternatively for achieving the above folding movement. It is also added that, in the embodiment, the pivotal connections in the linkage mechanism are realized by pin joints, and so are other connections in other members; however, the invention is not limited to this. For simplifying the drawing reading, pins required for the pin joints are not shown in the drawings.

In addition, in the embodiment, the stroller frame of the foldable stroller 3 includes a tray 46, a fixed part 48, and a tray connecting part 50. Two end portions of the tray 46 are pivotally connected relative to the first rotation axis 382 to the outsides respectively of the first pivot parts 386 of the connection devices 38 on two sides of the stroller frame. The fixed part 48 is mounted on the first linking part 40. An end portion of the tray connecting part 50 is pivotally connected to the tray 46 (at the place designated with a label A in FIG. 5). The other end portion of the tray connecting part 50 is pivotally connected to the fixed part 48. Thereby, during the folding of the front-leg support member 32, the rear-leg support member 34, and the upper support member 36 driven by the linkage mechanism, the tray 46 is also folded through the tray connecting part 50 driven by the linkage mechanism. It is added that, in the embodiment, the tray connecting part 50 passes between the first pivot part 386 and the region where the tray 46 and the connection device 38 are pivotally connected, so the first pivot part 386 thereon forms a release space 3862 for the tray connecting part 50 to pass through and avoiding interference.

Furthermore, in the embodiment, the stroller frame of the foldable stroller 3 includes a seat plate 52, disposed on the third linking parts 44, so the seat plate 52 is also folded together with the third linking parts 44 during folding the stroller frame of the foldable stroller 3. Besides, a bracket 54 is formed to extend from the end portions 424 of the second linking part 42 opposite to the front-leg support member 32, for disposing a basket by the user. Therein, the stroller frame of the foldable stroller 3 in the embodiment shows a bilateral symmetrical structure, and two ends of the bracket 54 are connected to the second linking parts 42 at two sides of the stroller frame respectively, so in practice, the two second linking parts 42 and the bracket 54 can be formed into one piece, such as by bending a tube member; however, the invention is not limited to this. It is added that, in the embodiment, there are connecting pedestals 522 disposed on the seat plate 52 for connecting a back tube 524 (shown in dashed lines in FIG. 3). In addition, the foldable stroller 3 can include a canvas bracket 56 (shown in dashed lines in FIG. 3), pivotally connected directly to the first pivot part 386, for supporting canvas (not shown in the figures).

Figure 9:
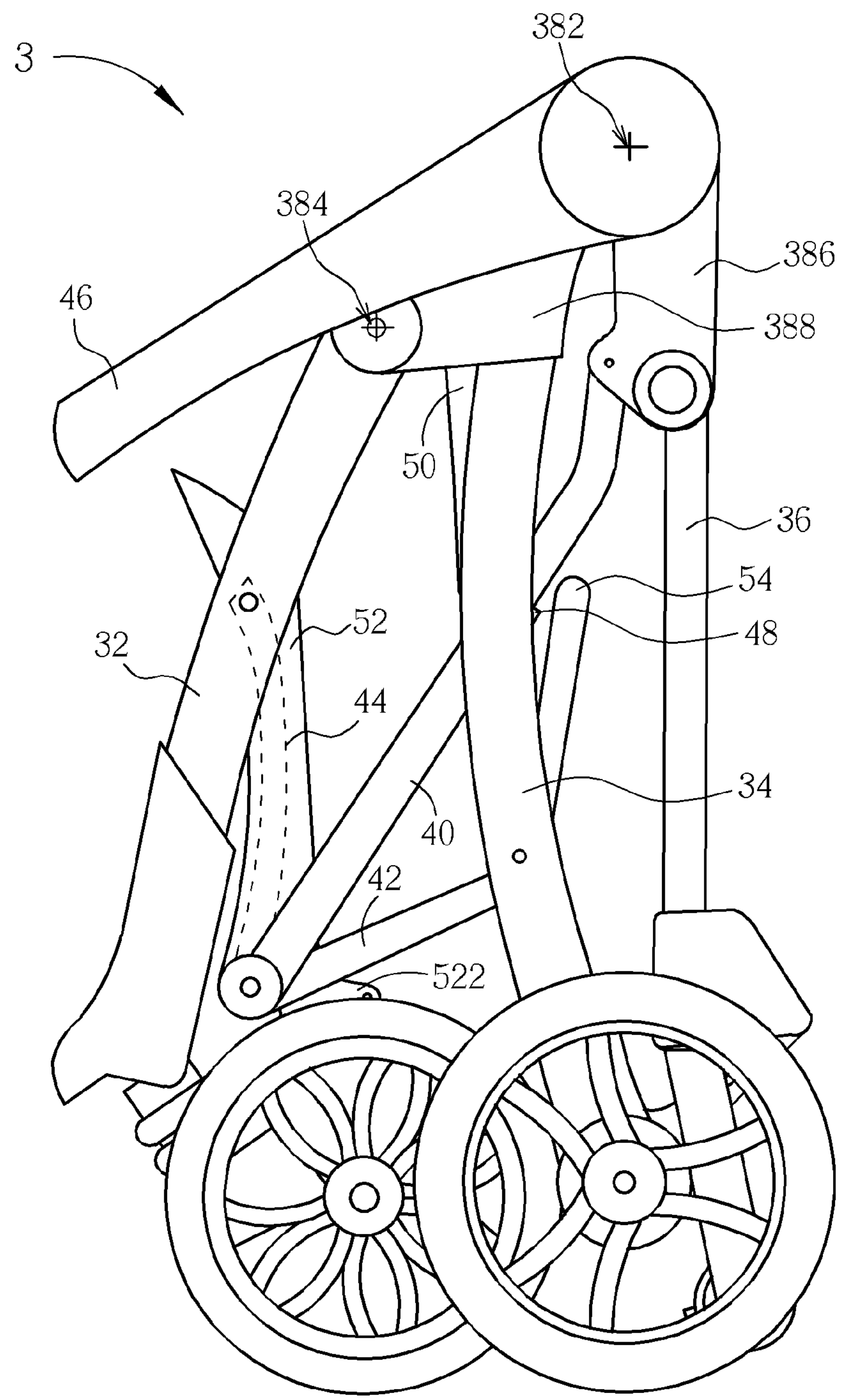

Please refer to FIGS. 6 through 9, which are schematic diagrams illustrating the successive operation of the foldable stroller 3; therein, the back tube 524 and the canvas bracket 56 are not shown, and the third linking part 44 is shown in dash lines. If the user is to fold the foldable stroller 3, the user can press the upper support member 36 down, the first linking part 40 is driven by the first pivot part 386 to drive the second linking part 42 and the third linking part 44, so that when the upper support member 36 rotates toward the rear-leg support member 34 relative to the first rotation axis 382 (shown by a cross mark in the figures), the front-leg support member 32 also rotates toward the rear-leg support member 34 relative to the second rotation axis 384 (shown by a cross mark in the figures). At the same time, the first linking part 40 through the fixed part 48 drives the tray connecting part 50, so that the tray 46 also rotates toward the front-leg support member 32. The seat plate 52 is disposed directly on the third linking parts 44, so the seat plate 52 is also folded together with the third linking parts 44. At last, the front-leg support member 32, the rear-leg support member 34, the upper support member 36, and the tray 46 are folded completely through the connection device 38 and the linkage mechanism they are connected to, as shown in FIG. 9.

Figure 6:
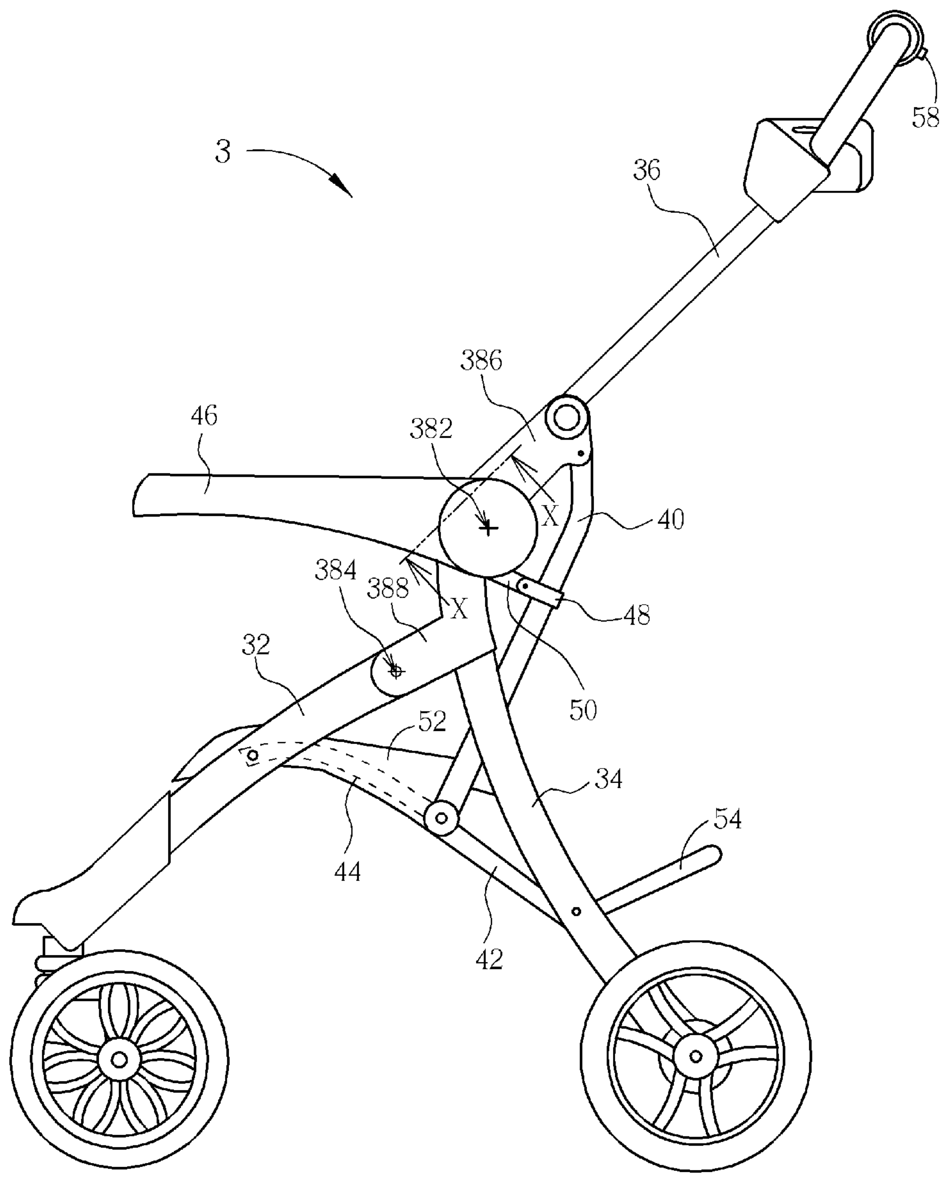
FIGS. 6 through 9 are schematic diagrams illustrating the successive operation of the foldable stroller in FIG. 3.
Figure 7:
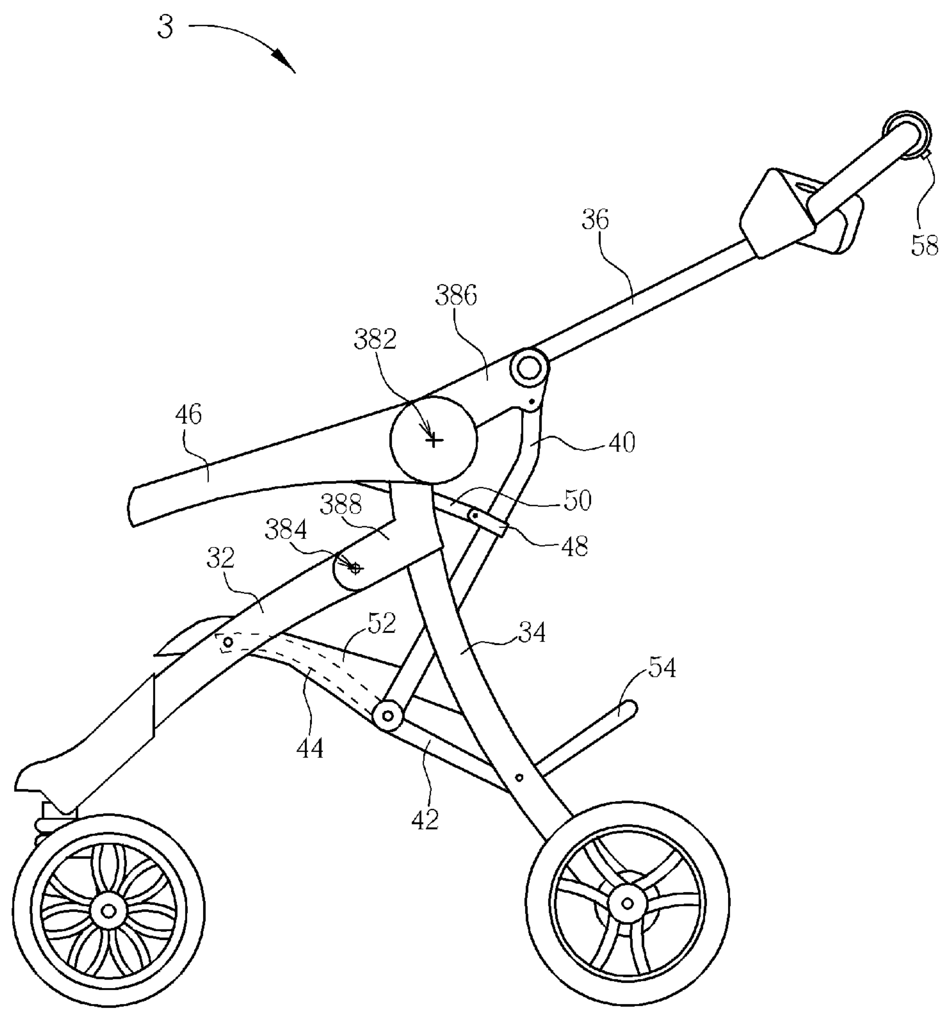
Figure 8:
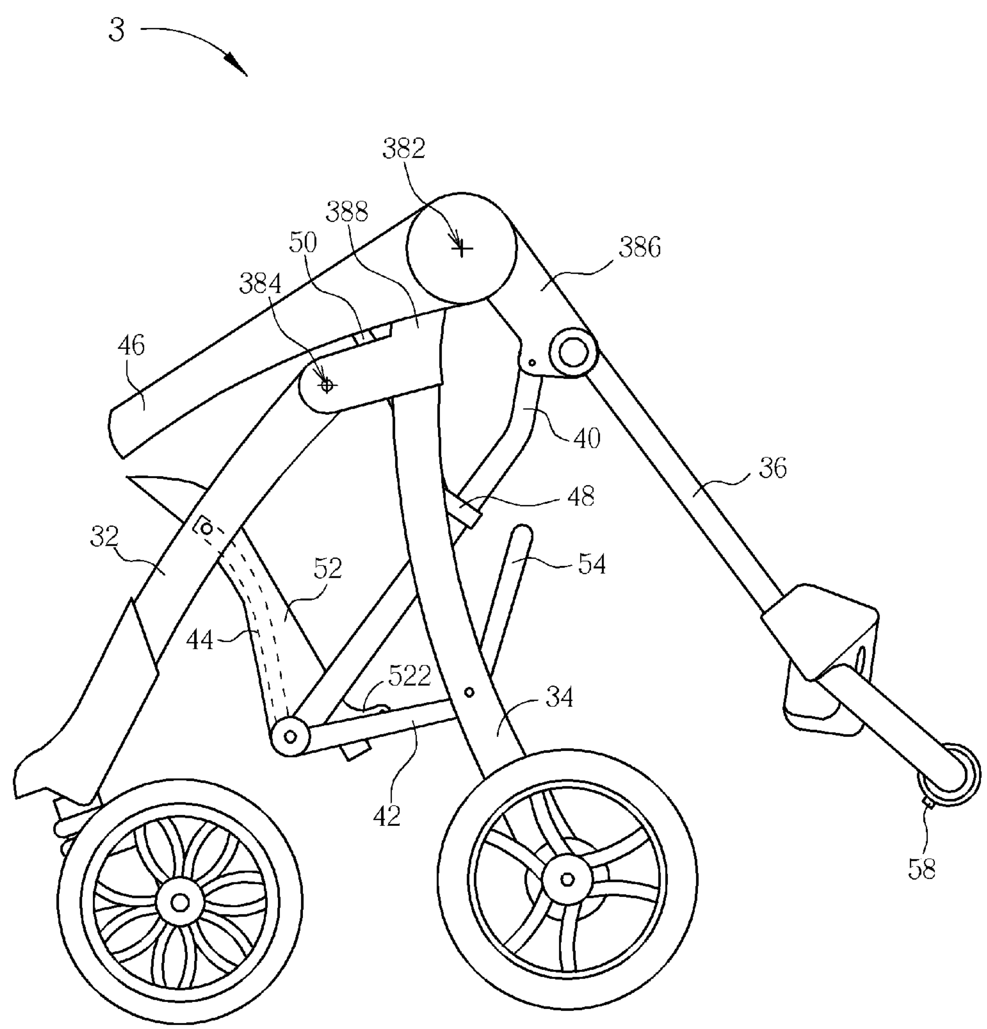
Figure 10:
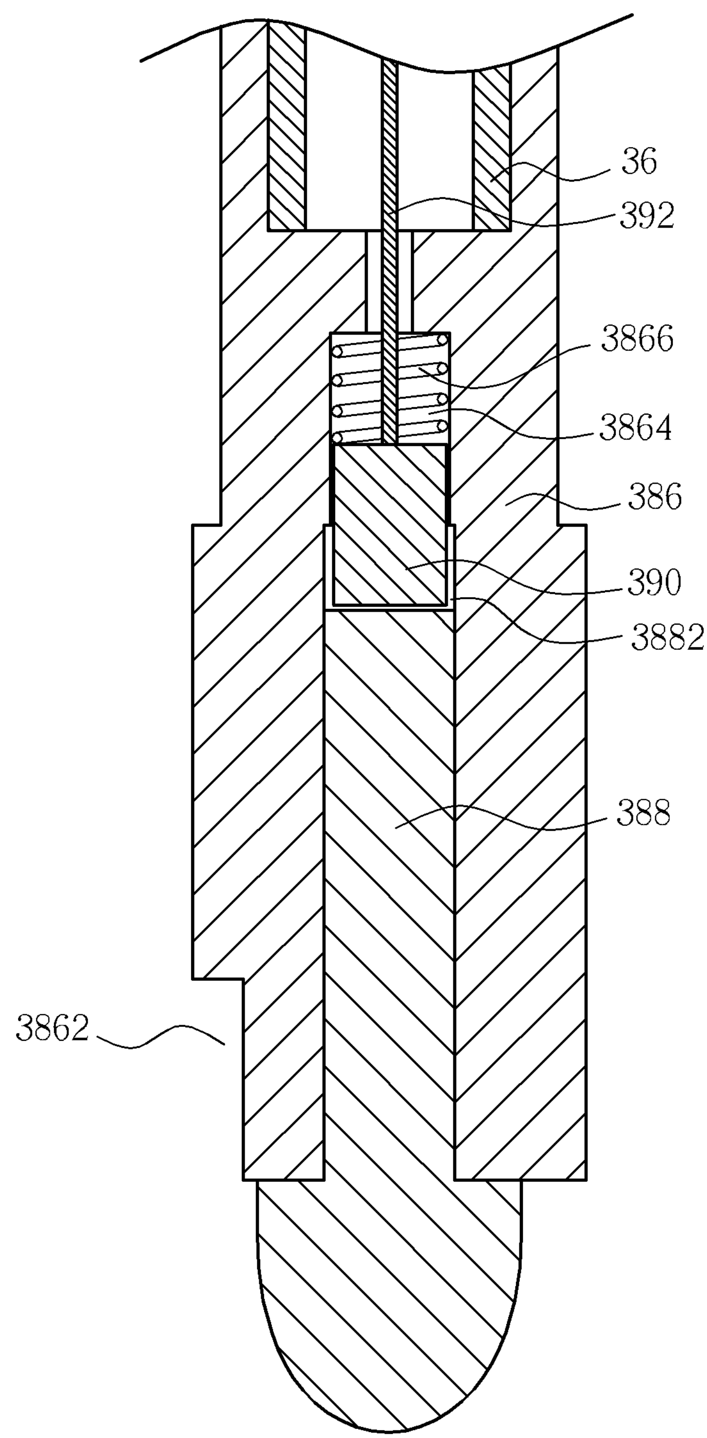
FIG. 10 is a partial cross view of the connection device along the line X-X in FIG. 6.

Please refer to FIG. 10, which is a partial cross view of the connection device 38 along the line X-X in FIG. 6; therein, the tray 46 and the tray connecting part 50 are not shown in the figure. For keeping the structure stable in use, the stroller frame is designed with a braking structure. In the embodiment, the connection device 38 includes a braking part 390, disposed in a slide 3864 of the first pivot part 386; the second pivot part 388 thereon forms a positioning hole 3882 (also referring to FIG. 5). The braking part 390 is urged by a spring 3866 disposed in the slide 3864, so as to slide in the positioning hole 3882. Thereby, the first pivot part 386 and the second pivot part 388 are locked by the braking part 390 from rotating. If the foldable stroller 3 is to be folded, an operation switch 58 (please referring to FIG. 3) can be cocked to drive the braking part 390 to slide away from the positioning hole 3882 by drawing a cable 392 connected to the braking part 390, which achieves the purpose of unlocking so that the first pivot part 386 and the second pivot part 388 can rotate relatively for folding the foldable stroller 3. Therein, an end of the cable 392 can pass through the interior of the upper support member 36 to be connected to the operation switch 58; in practice, the braking structure can be disposed on the linkage mechanism alternative, and the invention is not limited to this.

Figure 11:
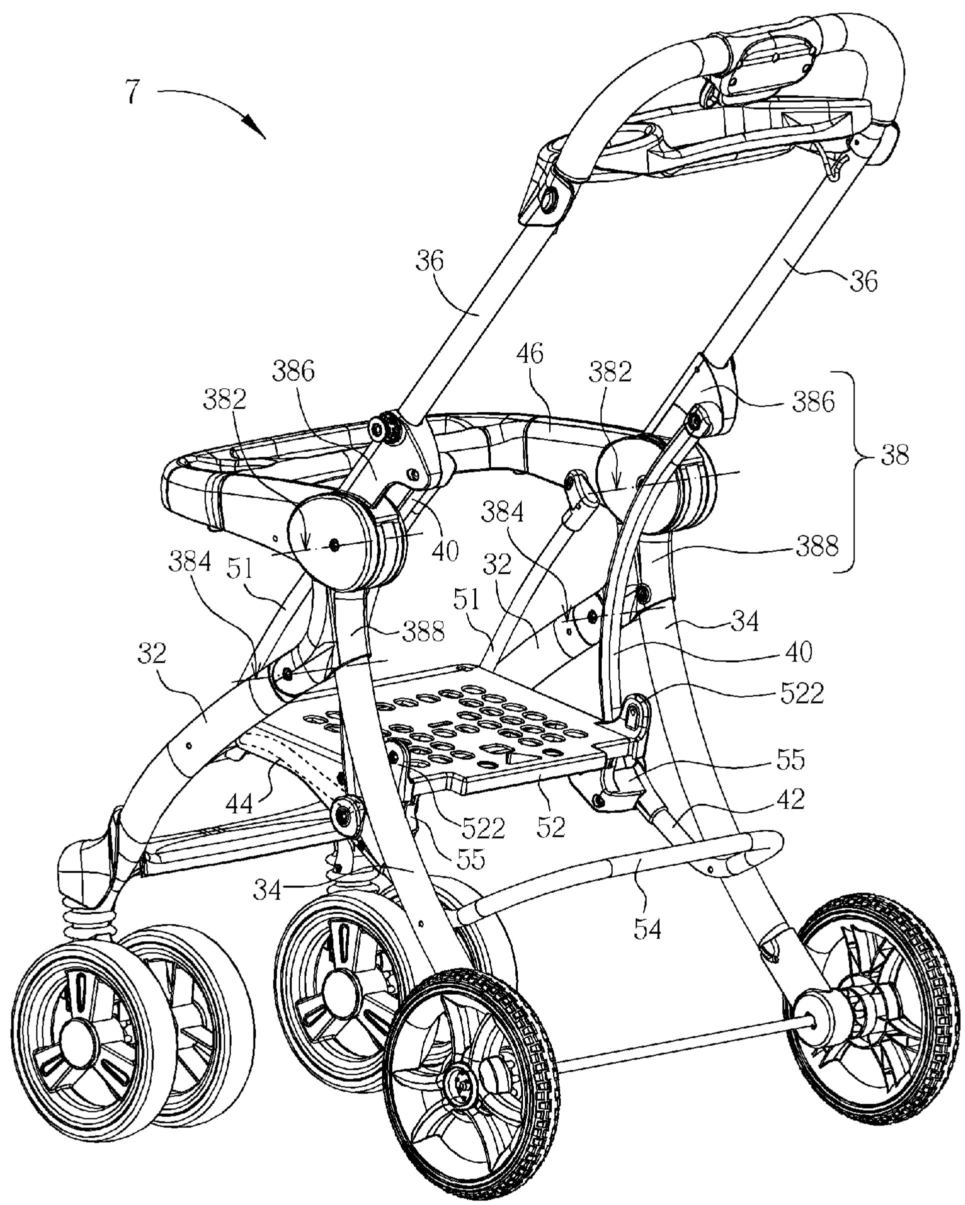
FIG. 11 and FIG. 12 are appearance schematic diagrams in different views of a foldable stroller of another preferred embodiment according to the invention.
Figure 12:
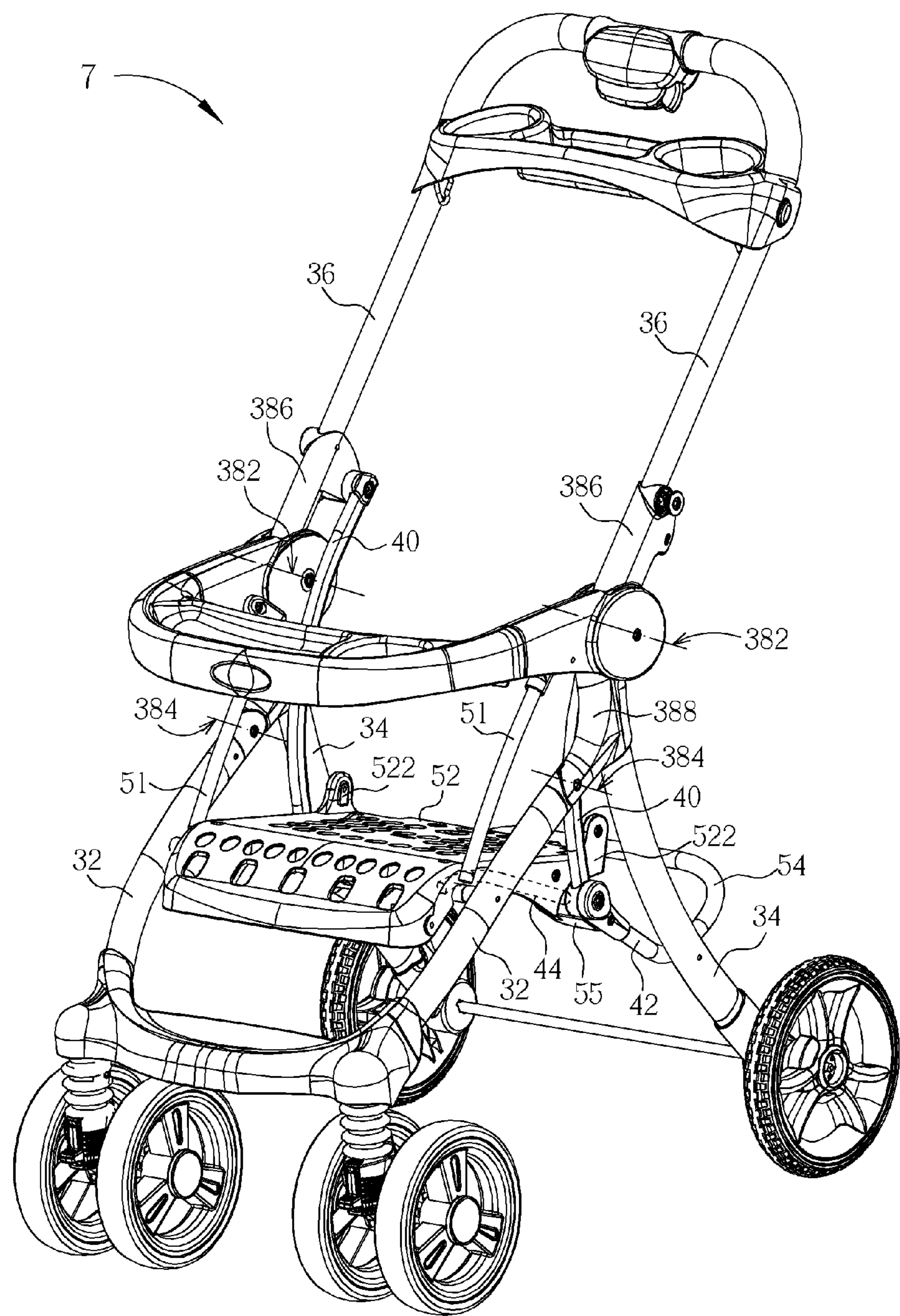

Please refer to FIG. 11 and FIG. 12, which are appearance schematic diagrams in different views of a foldable stroller 7 of another preferred embodiment according to the invention; therein, for simplifying the drawing reading, the back tube 524 and the canvas bracket 56 are not shown in FIG. 11 and FIG. 12, also in other figures of this embodiment. The foldable stroller 7 is substantially equal to the foldable stroller 3 in structure. The foldable stroller 7 also uses the connection device 38 and the linkage mechanism consisting of the first linking part 40, the second linking part 42, and the third linking part 44 (shown in dashed lines in the figures) to driving the front-leg support member 32, the rear-leg support member 34, and the upper support member 36 for realizing the folding purpose. The difference is that, the seat plate 52 of the foldable stroller 7 is no longer fixed directly on the third linking parts 44, and the tray connecting part 51 connecting the tray 46 is no longer connected to the first linking part 40 but pivotally connected to the seat plate 52; besides, the foldable stroller 7 additionally includes a fixing part 55 fixed on the second linking part 42 for together with the bracket 54 supporting and fixing a basket. Because of the difference in structure mentioned above, the folding operation of the tray 46 and the seat plate 52 in this embodiment is different to that in the previous embodiments; the details thereof will be explained together with the folding operation of the foldable stroller 7 in the following.

Figure 13:
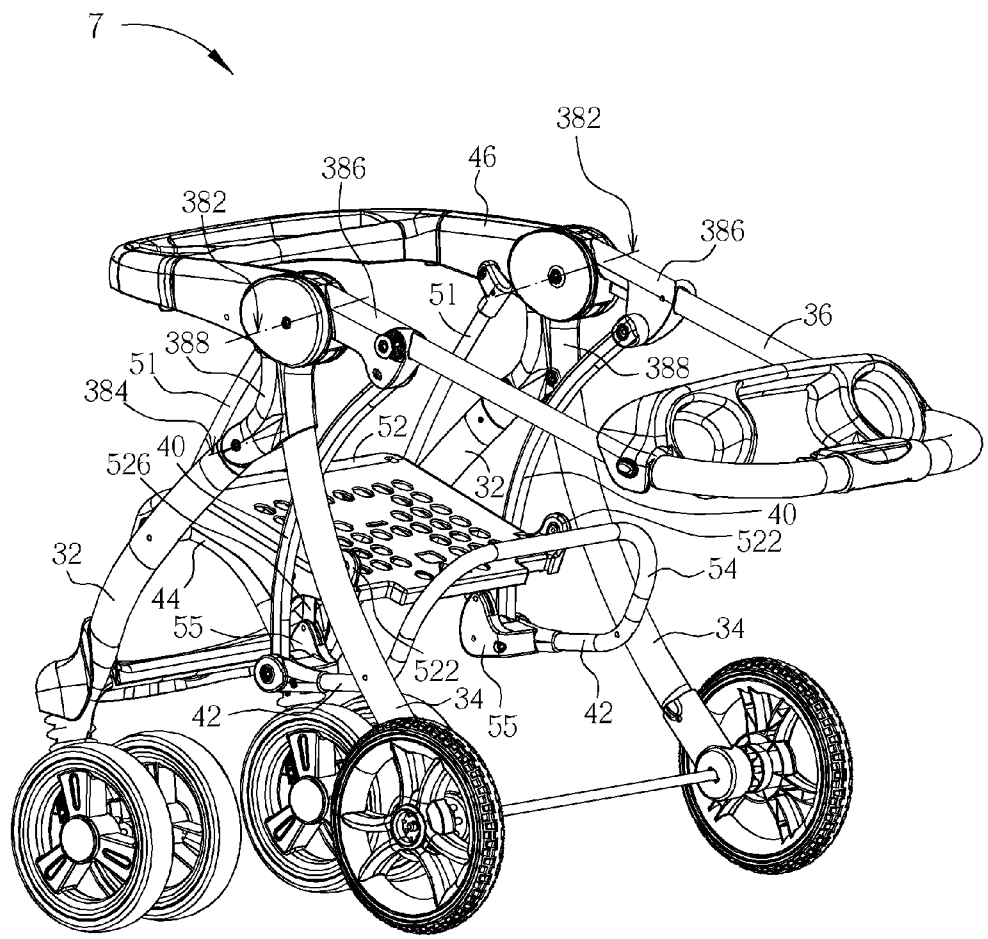
FIG. 13 and FIG. 14 are appearance schematic diagrams in different views of the foldable stroller in semi-folded states.
Figure 14:
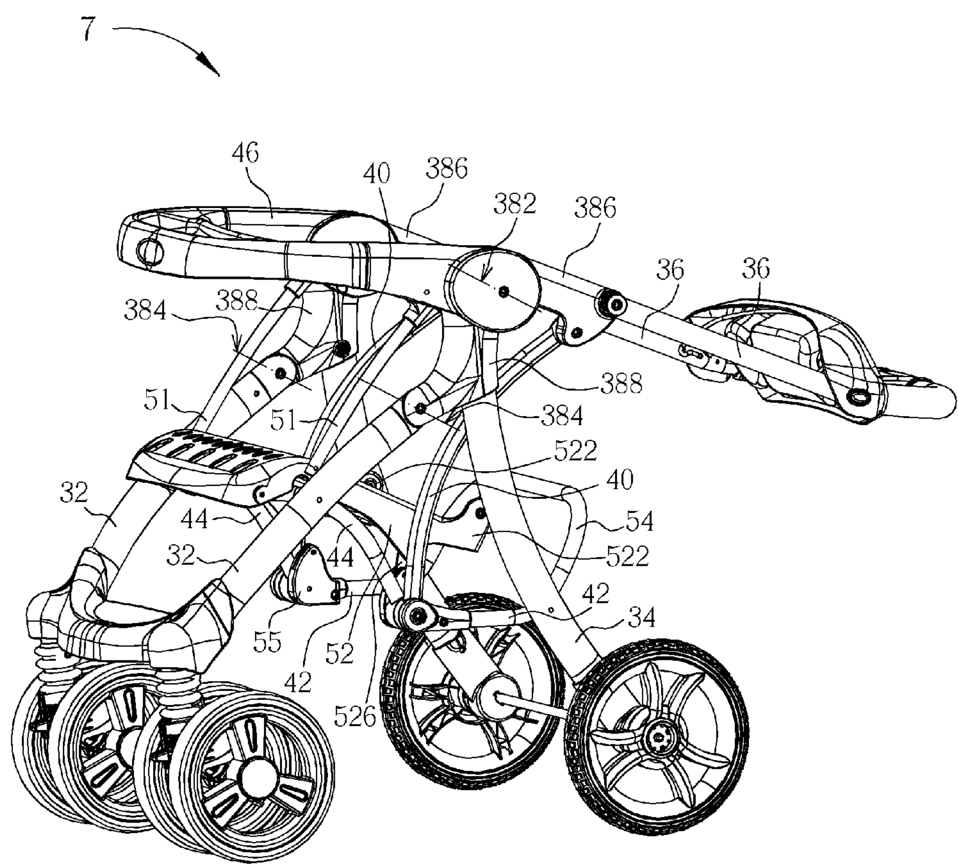
Figure 15:
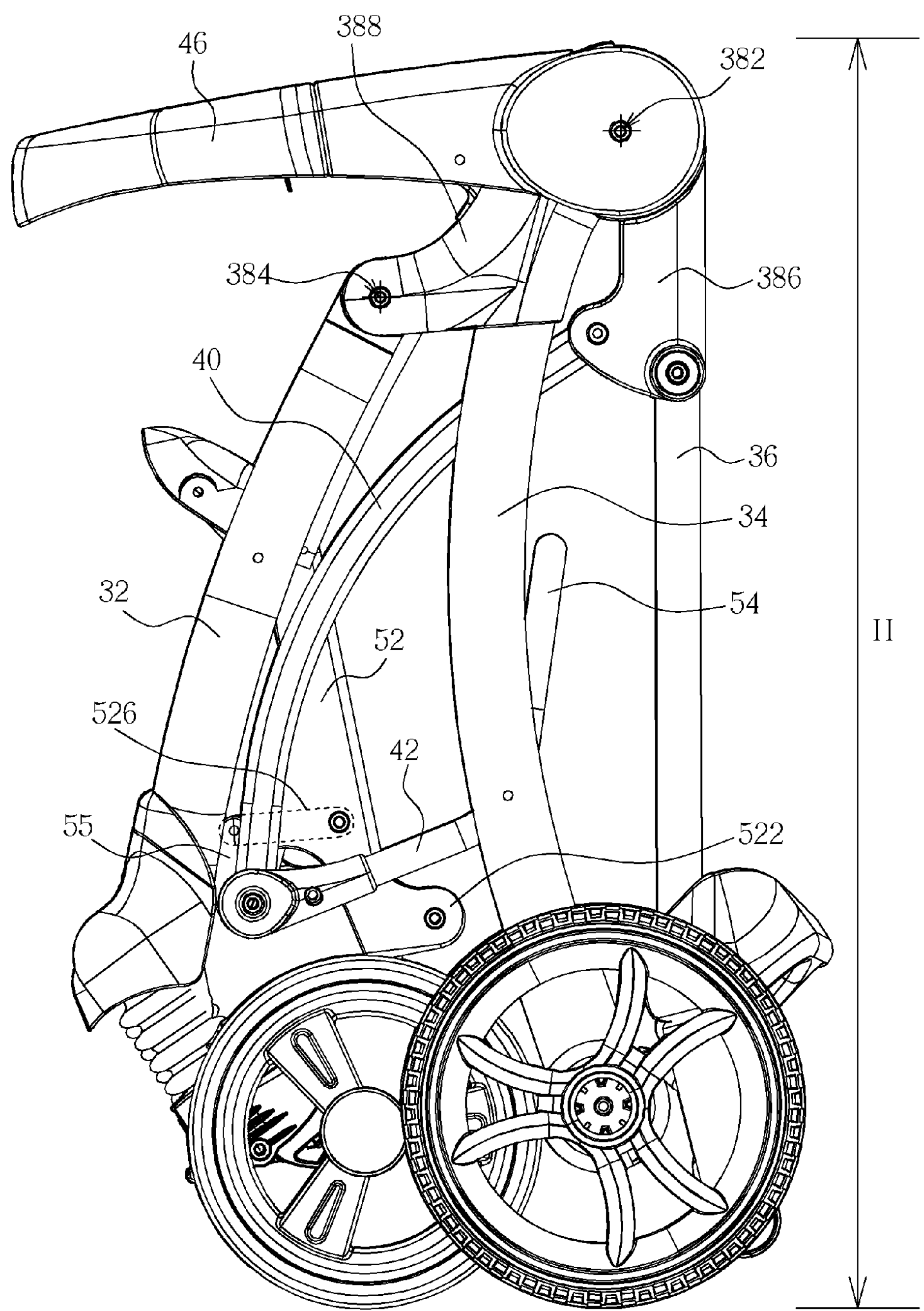
FIG. 15 is a side view of the foldable stroller after being folded.

Please refer to FIGS. 12 through 15. FIG. 13 and FIG. 14 are appearance schematic diagrams in different views of the foldable stroller 7 in semi-folded states. FIG. 15 is a side view of the foldable stroller 7 after being folded. In the folding of the foldable stroller 7, the folding mechanism of the first linking part 40, the second linking part 42, the third linking part 44, the front-leg support member 32, the rear-leg support member 34, and the upper support member 36 is equal to that of the foldable stroller 3 and is not to be described more. Further, the fixing part 55 is fixed on the second linking part 42, so the fixing part 55 rotates together with the second linking part 42 in the folding. In this embodiment, the stroller frame of the foldable stroller 7 further includes a seat connecting part 526 (in FIG. 15, shown in dashed lines). Two ends of the seat connecting part 526 are pivotally connected to fixing part 55 and the seat plate 52 respectively. An end of the tray connecting part 51 is fixed on the tray 46. The other end of the tray connecting part 51 is pivotally connected to the seat plate 52. In addition, a side arm of the seat plate 52 form a recess for clasping a pivotal connection portion of the third linking part 44 and the front-leg support member 32 when the seat plate 52 is used. Therefore, when the third linking part 44 is driven to rotate, the seat plate 52 is lift from the third linking part 44; besides, the seat plate 52 is also folded together with the other members during the folding.

It is added that, in this embodiment, the tray 46 is driven to be folded through the seat plate 52; however, the invention is not limited to this. For example, the tray connecting part 51 can be pivotally connected directly to the tray 46 and the front-leg support member 32 respectively, so as to be also folded with the folding of the front-leg support member 32. Besides, in this embodiment, a length H of the folded foldable stroller 7 is equal to about the length of the upper support member 36. That is, the connection device 38 connecting the three main support members simultaneously (i.e. the front-leg support member 32, the rear-leg support member 34, and the upper support member 36), in practice, the length H can be determined by designing the lengths from the first rotation axis 382 to a distal end of each support member; therein, the diameters of wheels depends on different cases to be involved in the consideration for the distal end of the front-leg support member 32 and the rear-leg support member 34. In addition, the description above the braking part 390 mentioned above is also applied to this embodiment, which is no long to be described herein. For other description of the foldable stroller 7, please refer to the relative description of the foldable stroller 3, which is no long to be described herein.

Compared with the prior art, the connection device according to the invention simultaneously connects the three main support members, so that the frame design of a foldable stroller using the stroller frame according to the invention can be simplified and avoid too many structural members. Furthermore, the stroller frame according to the invention is able to fold the three support members at a time; further, the tray is driven through the linking parts and the bracket for disposing a basket is connected directly to the linking parts, so as to fold these parts simultaneously. It is conducive to folding the foldable stroller with one hand by the user. In addition, the three main support members are connected directly to the connection device, so the length of the folded foldable stroller can be determined by designing the lengths from the connection device to a distal end of each main support member; that is, the length of a foldable stroller using the stroller frame according to the invention after being folded is substantially equal to the length of the longest support member, which solves the problem that the length of a foldable stroller in the prior art is obviously longer than that of the longest support members thereof and obtains a better reduction of the length of the foldable stroller after being folded relative to the length of the foldable stroller before being folded.

Those skilled in the art will readily observe that numerous modifications and alterations of the device and method may be made while retaining the teachings of the invention.

What is claimed is:

1. A stroller frame for a foldable stroller, the stroller frame comprising:

a front-leg support member;

a rear-leg support member;

an upper support member;

a connection device, connecting the front-leg support member, the rear-leg support member, and the upper support member respectively, such that the rear-leg support member and the upper support member can rotate relative to a first rotation axis and the front-leg support member and the rear-leg support member can rotate relative to a second rotation axis, wherein the connection device comprises a first pivot part and a second pivot part, the first pivot part and the second pivot part are pivotally connected relative to the first rotation axis, the upper support member is connected to the first pivot part, the rear-leg support member is connected to the second pivot part, and the front-leg support member and the second pivot part are pivotally connected relative to the second rotation axis;

a first linking part; and a second linking part, wherein an end portion of the first linking part is pivotally connected to the first pivot part or the upper support member, another end portion of the first linking part is pivotally connected to an end portion of the second linking part, and another end portion of the second linking part is pivotally connected to the rear-leg support member.

2. The stroller frame of claim 1, further comprising a third linking part, wherein an end portion of the third linking part is pivotally connected to the first linking part or the second linking part, and another end portion of the third linking part is pivotally connected to the front-leg support member.

3. The stroller frame of claim 2, further comprising a tray, a fixed part, and a tray connecting part, wherein the tray is pivotally connected to the connection device relative to the first rotation axis, the fixed part is mounted on the first linking part, and the tray connecting part is pivotally connected to the tray and the fixed part respectively.

4. The stroller frame of claim 2, further comprising a seat plate, disposed on the third linking part.

5. The stroller frame of claim 2, further comprising a bracket extending from the second linking part opposite to the front-leg support member.

6. The stroller frame of claim 5, further comprising a fixing part, mounted on the second linking part, wherein the fixing part and the bracket together can support and fix a basket.

7. The stroller frame of claim 6, further comprising a seat plate, a seat connecting part, a tray, and a tray connecting part, wherein the seat connecting part is pivotally connected to the fixing part and the seat plate respectively, the tray is pivotally connected to the connection device relative to the first rotation axis, and the tray connecting part is pivotally connected to the seat plate and is connected the tray.

8. The stroller frame of claim 1, wherein the connection device comprises a braking part, for locking the first pivot part and the second pivot part from rotating.

* * * * *